US011539311B2

(12) United States Patent
Niemann et al.

(10) Patent No.: US 11,539,311 B2
(45) Date of Patent: Dec. 27, 2022

(54) CONTROL OF A FAN MOTOR FOR AN IMPROVED EMC BEHAVIOR

(71) Applicant: Elektrosil GmbH, Hamburg (DE)

(72) Inventors: Hendrik Niemann, Hamburg (DE); Martin Oppermann, Hamburg (DE)

(73) Assignee: ELEKTROSIL GMBH, Hamburg (DE)

( * ) Notice: Subject to any disclaimer, the term of this patent is extended or adjusted under 35 U.S.C. 154(b) by 0 days.

(21) Appl. No.: 16/642,229

(22) PCT Filed: Aug. 27, 2018

(86) PCT No.: PCT/EP2018/073021
§ 371 (c)(1),
(2) Date: Feb. 26, 2020

(87) PCT Pub. No.: WO2019/042936
PCT Pub. Date: Mar. 7, 2019

(65) Prior Publication Data
US 2020/0358377 A1     Nov. 12, 2020

(30) Foreign Application Priority Data
Aug. 29, 2017   (DE) ..................... 10 2017 119 740.0

(51) Int. Cl.
*H02P 6/06*     (2006.01)
*H02P 6/26*     (2016.01)
(Continued)

(52) U.S. Cl.
CPC .................. *H02P 3/12* (2013.01); *H02P 6/26* (2016.02); *H02P 7/04* (2016.02)

(58) Field of Classification Search
CPC .......... H02P 6/20; H02P 7/29; H02P 2205/07; H02P 6/06; H02P 6/26; H02P 7/2805; H02P 3/12
See application file for complete search history.

(56) References Cited

U.S. PATENT DOCUMENTS 3,916,276 A    10/1975   Ottoson
4,524,316 A *   6/1985   Brown .................... B60L 50/13
                                                      318/727
(Continued)

FOREIGN PATENT DOCUMENTS

DE         10336945 A1     2/2005
DE     102007036027 A1     3/2008
(Continued)

OTHER PUBLICATIONS

International Search Report dated Nov. 16, 2018; International Application No. PCT/EP2018/073021.

*Primary Examiner* — Thai T Dinh
(74) *Attorney, Agent, or Firm* — Dinsmore & Shohl LLP

(57) ABSTRACT

A method is provided for electrically driving a motor having a plurality of phase windings such that EMC (electromagnetic compatibility) is improved and the running performance of the motor is simultaneously kept constant. At least one of the phase windings is not supplied with a current pulse during a complete revolution of the rotor, or at least one switchable electrical resistor is switched on, for at least one subsequent commutation phase by means of an electrical switching element, if the detected rotor speed is greater than the specified target speed.

12 Claims, 4 Drawing Sheets

(51) Int. Cl.
  *H02P 6/20* (2016.01)
  *H02P 7/29* (2016.01)
  *H02P 3/12* (2006.01)
  *H02P 7/03* (2016.01)

(56) References Cited

U.S. PATENT DOCUMENTS

| | | | | |
|---|---|---|---|---|
| 4,588,934 | A * | 5/1986 | Suzuki | H02P 7/29 |
| | | | | 318/449 |
| 5,995,710 | A * | 11/1999 | Holling | H02P 6/15 |
| | | | | 388/811 |
| 6,671,459 | B1 * | 12/2003 | Bultman | H02P 7/2913 |
| | | | | 318/434 |
| 7,187,853 | B2 * | 3/2007 | Mayer | B60H 1/00828 |
| | | | | 318/449 |
| 7,279,862 | B1 * | 10/2007 | Welchko | B60L 3/0069 |
| | | | | 318/564 |
| 9,537,433 | B2 * | 1/2017 | Yamaguchi | H02P 6/28 |
| 10,158,317 | B2 * | 12/2018 | Kondo | H02P 25/18 |
| 10,530,147 | B2 * | 1/2020 | Itten | H02P 29/032 |
| 2005/0002656 | A1 * | 1/2005 | Mayer | B60H 1/00828 |
| | | | | 388/804 |
| 2005/0174081 | A1 | 8/2005 | Nguyen et al. | |
| 2006/0104822 | A1 * | 5/2006 | Hahn | H02P 6/28 |
| | | | | 417/42 |

FOREIGN PATENT DOCUMENTS

DE    102015012540  A1    3/2017
EP         2025054  B1    8/2015

* cited by examiner

CONTROL OF A FAN MOTOR FOR AN IMPROVED EMC BEHAVIOR

CROSS-REFERENCE TO RELATED APPLICATIONS

This application is the U.S. national stage of PCT/EP2018/073021 filed Aug. 27, 2018, which claims priority of German Patent Application 10 2017 119 740.0 filed Aug. 29, 2017 both of which are hereby incorporated by reference in their entirety.

FIELD OF THE INVENTION

The invention relates to a method for electrically driving a motor, in particular a fan motor, having a plurality of phase windings, wherein the motor has means for detecting a rotor speed and/or a rotor position of a rotor of the motor, and wherein current pulses are alternately applied to the individual phase windings by means of drive electronics of the motor.

The invention further relates to a motor and a fan having a motor, wherein the motor is designed for being driven electronically according to a method according to the invention.

BACKGROUND OF THE INVENTION

Various types of electrically commutated motors are known in the prior art. For example, the stator of a motor is supplied with a plurality of electric current pulses per complete rotor revolution about 360°. In the case of two-phase motors, the stator phase windings are, for example, supplied with two stator current pulses in succession during a complete rotor rotation about 360°. Three, six or more stator current pulses are correspondingly supplied during a complete rotor rotation about 360° in the case of three-phase, six-phase or multi-phase motors.

A method for driving a fan motor is described in EP 20 25 054 B1, wherein an additional controllable semiconductor switch is used, which is arranged in the supply line from the DC intermediate circuit to the parallel circuit. As a result, the energy supply from an external DC source to the motor is switched off at a convenient time, and the energy, which is stored in the phase winding in question when the supply is switched off, is transformed into a motor torque via a special freewheeling circuit.

SUMMARY OF THE INVENTION

The aim of the present invention is to provide a method for electrically driving a motor, in particular a fan motor, having a plurality of phase windings, which improves the EMC (electromagnetic compatibility) of the fan motor compared to fan motors known in the prior art on the one hand, but at the same time keeps the noises resulting from the rotational movement of the motor low.

A method for electrically driving a motor, in particular a fan motor, having a plurality of phase windings is therefore provided according to the invention, wherein the motor has at least one means for detecting a rotor speed and/or for detecting a rotor position of a rotor of the motor. Current pulses are alternately applied to the individual phase windings by means of drive electronics of the motor. According to the invention, during a complete revolution of the rotor, at least one of the phase windings is not supplied with a current pulse, if the detected rotor speed ($T_{actual}$) is greater than a specified target speed ($T_{target}$).

The method is advantageously provided for an external rotor motor and a brushless motor. The individual phase windings are preferably windings of the stator. Alternating energization of the phase windings is to be understood as successive current pulses being supplied to the individual phase windings. A complete revolution of the rotor is to be understood as a revolution about 360°.

Interruption of the power supply during a complete revolution of the rotor is also described as slot shutdown in the context of the invention. This is to be understood as at least one phase winding not being supplied with power or a current pulse during at least one commutation phase.

The method according to the invention therefore envisages that the actual speed of the rotor or the current rotor speed is regularly measured, compared with a specified target speed ($T_{target}$), and the current pulse is suspended in a subsequent commutation phase, if the difference exceeds a specified threshold or value or if the actual speed ($T_{actual}$) is greater than the specified target speed ($T_{target}$).

The rotor speed ($T_{actual}$) is preferably constantly detected and the power supply is suspended on one of the phase windings for a subsequent commutation phase, if the rotor speed ($T_{actual}$) is greater than the specified target speed ($T_{target}$). A commutation phase is to be understood as the energization of a phase winding. Four commutation phases are therefore provided for a motor having, for example, four phase windings for a complete revolution of the rotor. If the measured rotor speed ($T_{actual}$) is greater than the specified target speed ($T_{target}$), the corresponding phase winding is not energized at least during one of the four commutation phases during a complete revolution of the rotor.

The means for detecting the rotor speed is preferably designed as a Hall effect sensor. By means of the Hall effect sensor, the current rotor speed ($T_{actual}$) can be detected directly or indirectly via the rotor position and preferably compared with the specified target speed ($T_{target}$) during each individual commutation phase. The power supply can particularly preferably be directly interrupted in the subsequent commutation phase if the rotor speed ($T_{actual}$) is exceeded.

In order to reduce the rotor speed, no more than half the phase windings of the motor are preferably not supplied with a current pulse during the complete revolution of the rotor, if the detected rotor speed ($T_{actual}$) is greater than the specified target speed ($T_{target}$). This can ensure a particularly stable running performance of the motor. Particularly preferably, no more than a quarter of the phase windings of the motor are not energized during a complete revolution of the rotor, if the detected rotor speed ($T_{actual}$) is greater than the specified target speed ($T_{target}$).

It is therefore preferably envisaged in the method for driving the motor that current pulses having a maximum current are applied to the corresponding phase windings during the individual commutation phases. In order to adjust or regulate and in particular reduce the rotor speed ($T_{actual}$), the current pulse is suspended for at least one phase winding during individual commutation phases. The EMC of the motor is considerably improved by virtue of the current pulses having a maximum current being provided. Nevertheless, the rotor speed ($T_{actual}$) can be set and in particular reduced by the so-called slot shutdown, if the rotor speed ($T_{acutal}$) is greater than the specified target speed ($T_{target}$).

In a further method according to the invention for electrically driving a motor, in particular a fan motor, having a plurality of phase windings, it is envisaged that at least one switchable electrical resistor is switched on for at least one subsequent commutation phase by means of an electronic switching element, if the detected rotor speed ($T_{actual}$) is greater than a specified target speed ($T_{target}$). For this purpose, the motor likewise has at least one means for detecting a rotor speed ($T_{actual}$) and/or a rotor position of a rotor of the motor as well as driving electronics for alternately applying current pulses to the phase windings.

The motor is likewise preferably designed as an external rotor motor and as a brushless motor. The individual phase windings are preferably the windings of the stator. A switchable resistor is understood to mean an electrical ohmic resistor, which by means of the electrical switching element, for example by means of a transistor, can be switched on or switched off. Switching on is to be understood as the electrical resistor being connected in series to the phase winding of the respective commutation phase and thus effectively reducing the current through the phase winding by acting as an ohmic load. Switching off the resistor is to be understood as short-circuiting the resistor by means of the electrical switching element. The current through the phase winding is therefore not effectively reduced by means of the switchable resistor during a commutation phase.

A state of the electronic switching element is preferably left unchanged during a commutation phase. This means that the switchable resistors are only switched or changed between commutation phases or only for a commutation phase which follows on from a current commutation phase by means of the electronic switching element. The switching state and thus the resistance value of the resistance wiring preferably remains constant during a current commutation phase. The current of the current pulse is therefore preferably not changed during the commutation phase, rather it is kept constant.

Furthermore, it is preferably envisaged that a current of the current pulse through the phase winding is reduced by means of the at least one switchable electrical resistor during a commutation phase for reducing the rotor speed ($T_{actual}$).

The drive electronics preferably have a plurality of electrical resistors connected in series, which are individually switched on and/or short-circuited by means of the electronic switching element or by means of a plurality of electronic switching elements as a function of the difference between the determined rotor speed ($T_{actual}$) and the specified target speed ($T_{target}$), thereby regulating the rotor speed ($T_{actual}$). A constant control is therefore preferably envisaged by constantly detecting the rotor speed ($T_{actual}$), by comparing it with the specified target speed ($T_{target}$) and by driving at least one switchable electrical resistor.

The current pulse having a maximum current is preferably applied to at least one of the phase windings during at least one commutation phase when the motor is started. This is to be understood as a so-called full power modulation. The motor is thus preferably driven with full load at all times, wherein an electrical resistor or a plurality of electrical resistors are switched on to reduce the rotor speed ($T_{actual}$), in order to reduce the effective current through the respective phase winding during at least one commutation phase.

The motor is preferably driven and/or a current pulse is preferably applied to a phase winding of the motor via a bridge circuit, in particular an H-bridge. This bridge circuit can be integrated in an integrated circuit (IC). The bridge circuit and/or the IC is therefore preferably controlled by means of a current having the maximum specified current. The current is reduced outside of the bridge circuit and/or the IC by means of switching on at least one switchable electrical resistor.

A combined method of rough adjustment of the rotor speed ($T_{actual}$) and fine adjustment of the rotor speed ($T_{actual}$) is preferably provided. For rough adjustment of the rotor speed ($T_{actual}$) during a complete revolution of the rotor according to a previously described method at least one of the phase windings is not supplied with a current pulse, if the detected rotor speed ($T_{actual}$) is greater than the specified target speed ($T_{target}$). For fine adjustment of the rotor speed ($T_{actual}$) according to a previously described method at least one switchable electrical resistor is switched on for at least one subsequent commutation phase by means of the electronic switching element, if the detected rotor speed ($T_{actual}$) is greater than a specified target speed ($T_{target}$).

The method preferably envisages a differentiation between rough adjustment and fine adjustment. If the difference between the determined rotor speed ($T_{actual}$) and the specified target speed ($T_{target}$) exceeds a specified threshold or a specified value and the rotor speed ($T_{actual}$) is greater than the target speed ($T_{target}$), the rotor speed ($T_{actual}$) is reduced in a first step by means of rough adjustment or slot shutdown. If the rotor speed ($T_{actual}$) detected after the rough adjustment is still larger than the specified target speed ($T_{target}$), but smaller than the specified threshold, the current of the current pulse is reduced for at least one commutation phase in a next step by means of fine adjustment and therefore by means of switching the resistors. The previously described rough adjustment can be carried out before or after the fine adjustment.

According to the invention, a motor, in particular a fan motor, having a plurality of phase windings is further provided. The motor has at least one means for detecting a rotor speed and/or a rotor position of a rotor of the motor and drive electronics for producing current pulses to be applied to the phase windings of the motor. According to the invention, the motor is designed for being driven by means of at least one of the previously described methods and particularly preferably for driving by means of a combination of the two previously described methods.

A fan having a motor, described previously, is further provided according to the invention for at least one method for driving the motor.

DETAILED DESCRIPTION OF THE INVENTION

Figure 1:
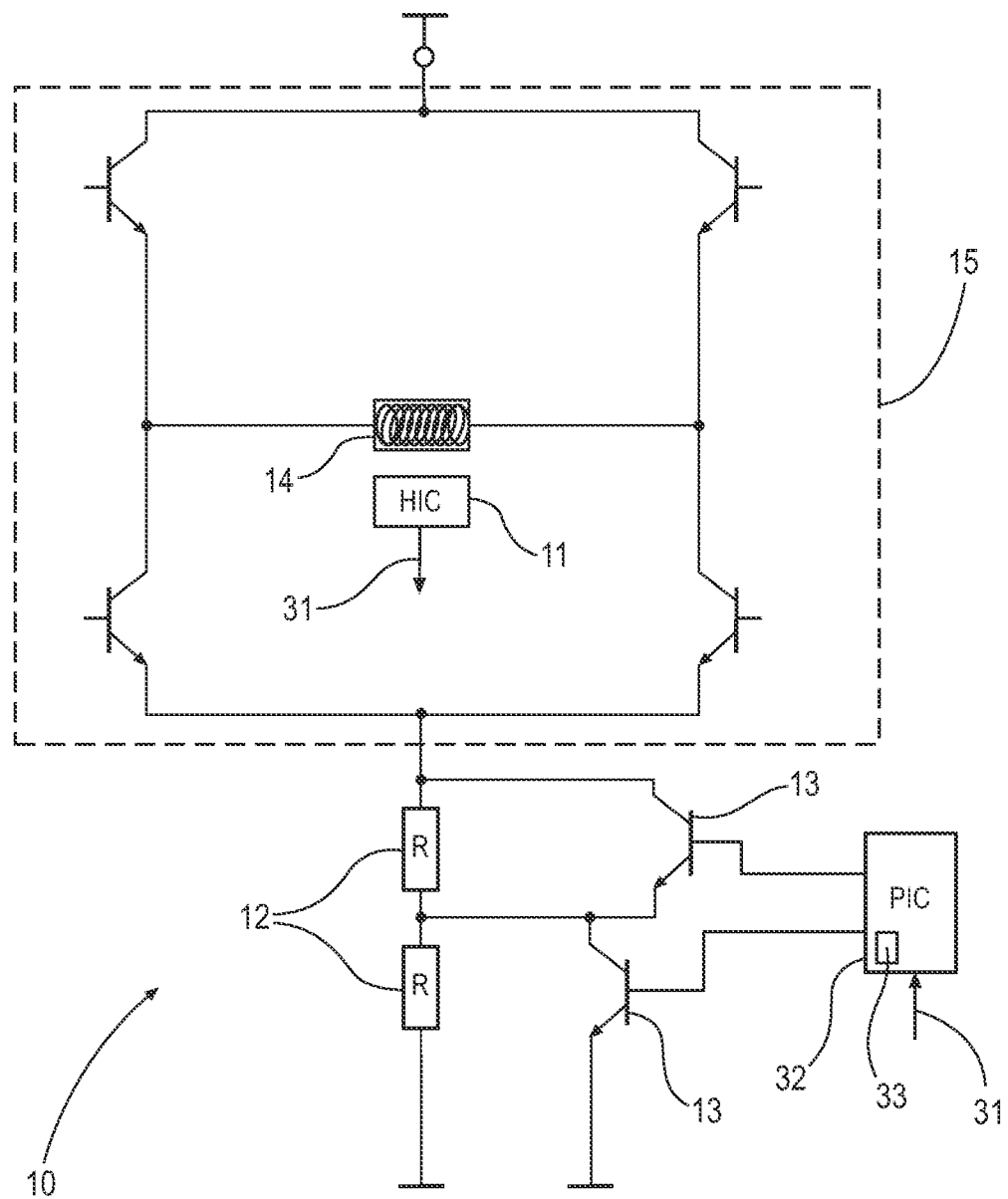
FIG. 1: shows a circuit diagram for driving electronics of a motor.

FIG. 1 shows a circuit diagram of driving electronics 10 or a section of the driving electronics 10 for a motor 100. The driving electronics 10 has two substantial circuit portions. A first circuit portion consists of a bridge circuit or an H-bridge, which is integrated into an integrated circuit (IC) 15. A second circuit portion consists of a series circuit of switchable electrical resistors 12, which are switched by means of electronic switching elements 13. The resistor network of the switchable electrical resistors 12 connected in series is connected in series to the H-bridge. A microprocessor 32, which includes a comparator 33, is electrically coupled to the driving electronics 10. In some embodiments, the microprocessor 32 is electrically coupled to the electronic switching element 13 of the driving electronics 10 and is configured to apply various amounts of current pulses alternately to individual phase windings of the plurality of phase windings.

The H-bridge or the IC 15 is always controlled with full load or with a maximum specified current for driving the motor 100 according to the invention. For fine adjustment, electrical resistors 12 can be switched on by means of the electronic switching elements 13 during individual commutation phases, in order to reduce the effective current of the current pulse 30 through a phase winding 14 of the stator of the motor 100 and thus reduce the rotor speed ($T_{actual}$), if it exceeds the specified target speed ($T_{target}$).

A slot interruption can be envisaged for rough adjustment. In this case, the current pulses 30 through phase windings 14 are omitted during individual commutation phases. If the detected rotor speed ($T_{actual}$) exceeds the specified target speed ($T_{target}$), the current pulse 30 can be applied through a phase winding 14 by means of rough adjustment, for example in a subsequent commutation phase.

Figure 2:
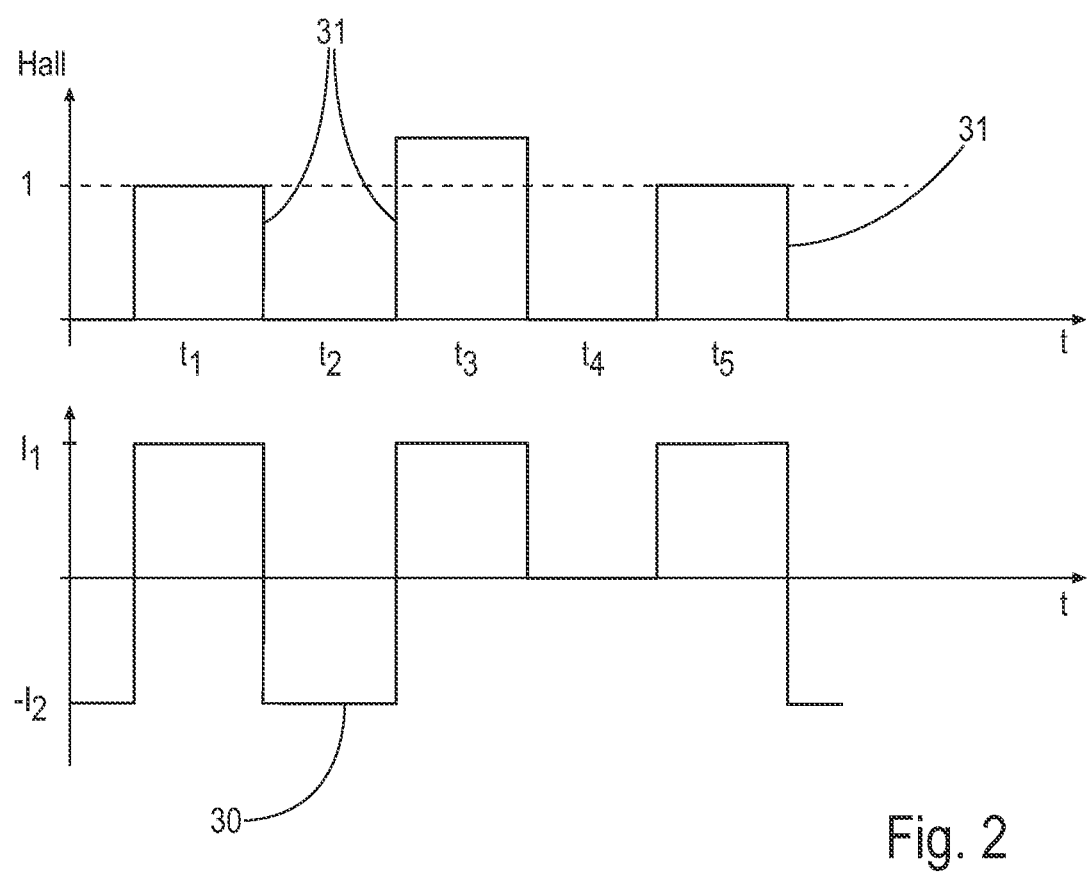
FIG. 2: shows the timing based on a diagram for a method for driving a motor with slot shutdown.

FIG. 2 shows a diagram showing the output signal 31 of the Hall effect sensor and the current path I of the individual current pulses 30 through the phase windings 14. The diagram in FIG. 2 is in this case based on the example of a rough adjustment. For example, the current pulse 30 has been interrupted during the commutation phase t4 in the example shown in FIG. 2. By means of the method for driving the motor 100 it has been determined during the commutation phase t3 that the rotor speed ($T_{actual}$) is greater than the specified target speed ($T_{target}$), and has thus been decided to omit or interrupt the current pulse 30 in the subsequent slot t4 or in the subsequent commutation phase. As a result of constantly checking the rotor speed ($T_{actual}$), it has in turn been determined during the commutation phase t4 that the rotor speed ($T_{actual}$) has got closer to the specified target speed ($T_{target}$) and the current pulse 30 has therefore been reinstated during the commutation phase t5.

With regard to the rough adjustment, it should be noted that the method envisages interrupting or omitting the current pulse 30 during a complete revolution of the rotor for as few commutations phases as possible, particularly preferably only during one commutation phase.

Figure 3:
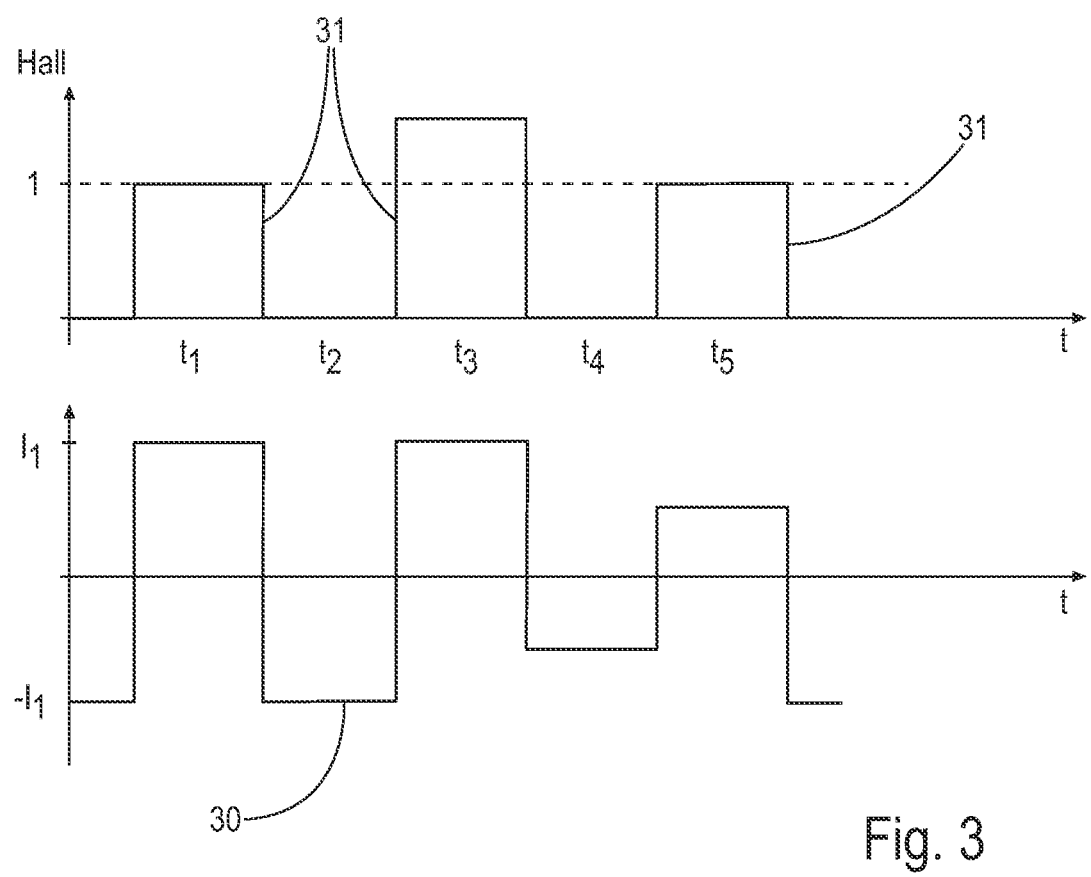
FIG. 3: shows a further timing based on a diagram for a method for driving motor by means of reducing a current using switched on series resistors.

FIG. 3 shows a corresponding diagram showing the outcome resulting from a fine adjustment based on switching on electrical resistors 12. In the example shown in FIG. 3, the effective current through the phase windings has been reduced during the commutation phases t4 and t5 by electronic resistors 12 being switched on by means of the electronic switching elements 13. This reduces the rotor speed ($T_{actual}$) by means of fine adjustment. In the example shown in FIG. 3, the electrical resistors 12 have not been closed or short-circuited by means of the electronic switching elements 13 during the commutation phases t1 to t3.

Figure 4:
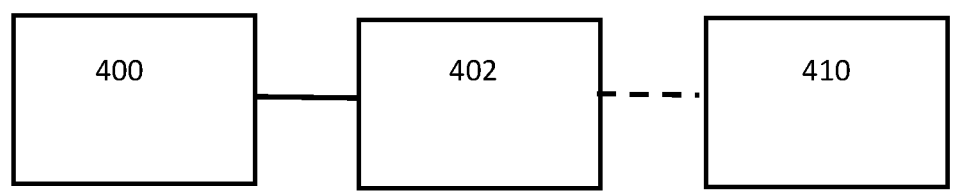
FIG. 4: shows a schematic diagram for a plurality of phase windings.

FIG. 4 is a schematic diagram showing three or more phase windings 400, 402 and 410. Each of the phase windings 400, 402 and 410 might be identical to the phase winding 14 shown in FIG. 1. Current pulses are alternately applied to the individual phase windings by drive electronics of the motor.

Figure 5:
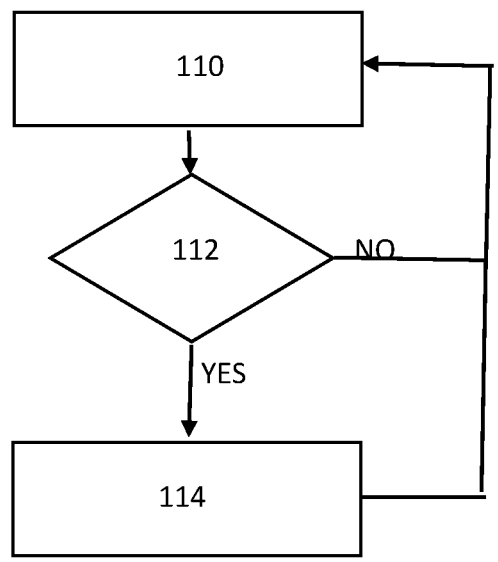
FIG. 5: shows a flowchart for an embodiment of the method of the present invention.

FIG. 5 is a flowchart showing the steps of the method according to an embodiment of the present invention. In step 110, the rotor speed is being constantly checked. In step 112, it is determined if the rotor speed is greater than the specified target speed. If the answer is Yes, then step 114 is executed where no more than half of the phase windings are not supplied a current pulse during a complete revolution of the rotor. The rotor speed continues to be checked for the subsequent commutation phase. If the answer is No, then the rotor speed continues to be checked.

REFERENCE LIST

100 motor
200 fan
10 driving electronics
11 means for detecting the rotor speed
12 electrical resistor
13 electronic switching element
14 phase winding
15 integrated circuit
30 current pulse
31 output signal of the Hall effect sensor
32 microprocessor

The invention claimed is:

1. A method for electrically driving a motor having a bridge circuit electrically coupling a plurality of phase windings, wherein the motor has a sensor for detecting a rotor speed and/or a rotor position of a rotor of the motor, the method comprising:
   applying, by a microprocessor, current pulses alternately to individual phase windings of the plurality of phase windings by drive electronics of the motor electrically coupled to the microprocessor, the drive electronics include the bridge circuit;
   performing, by the microprocessor, a rough adjustment of the rotor speed when a difference between the determined rotor speed ($T_{actual}$) and a specified target speed ($T_{target}$) exceeds a specified threshold, the rough adjustment of the rotor speed is performed during a complete revolution of the rotor by not supplying a current pulse to no more than half of the phase windings of the plurality of phase windings; and
   performing, by the microprocessor, a fine adjustment of the rotor speed after the rough adjustment when the determined rotor speed ($T_{actual}$) is larger than the specified target speed ($T_{target}$) and when the difference between the determined rotor speed ($T_{actual}$) and the specified target speed ($T_{target}$) is smaller than the specified threshold by switching on at least one switchable electrical resistor of the drive electronics for at least one subsequent commutation phase by at least one electronic switching element of the drive electronics.

2. The method according to claim 1, wherein:
   a state of the at least one electronic switching element is left unchanged during a commutation phase.

3. The method according to claim 1, wherein:
   an electrical current of the current pulse through the phase winding is reduced by the at least one switchable electrical resistor during the at least one subsequent commutation phase for reducing the rotor speed.

4. The method according to claim 1, wherein:
   the drive electronics comprises a plurality of switchable electrical resistors connected in series; and
   the plurality of switchable electrical resistors are individually switched on and/or short-circuited by the at least one electronic switching element as a function of the difference between the determined rotor speed and the specified target speed, thereby regulating the rotor speed.

5. The method according to claim 4, wherein:
the drive electronics further comprises a plurality of electronic switching elements operable to individually switch on and/or short circuit the plurality of switchable electrical resistors.

6. The method of claim 1, further comprising the steps of:
applying a maximum current of the current pulses to at least one of the phase windings during at least one commutation phase when the motor is started.

7. The method of claim 6, wherein the drive electronics further comprises:
at least one switchable electrical resistor configured to reduce an electrical current of the current pulses to the maximum current that is applied to at least one of the phase windings during at least one commutation phase when the motor is started, the at least one switchable electrical resistor positioned in series the bridge circuit and electrically coupled to the bridge circuit and the microprocessor.

8. The method of claim 6, wherein the at least one switchable electrical resistor is positioned in series between the bridge circuit and the microprocessor and is electrically coupled to the bridge circuit and the microprocessor.

9. A system, comprising:
a motor;
a drive electronics circuit electrically coupled to the motor, the drive electronics circuit having:
a bridge circuit;
a plurality of phase windings electrically coupled to the bridge circuit;
a sensor for detecting a rotor speed and/or a rotor position of a rotor of the motor electrically coupled to the bridge circuit; and
a microprocessor electrically coupled to the drive electronics circuit and operable to:
apply current pulses alternately to the plurality of phase windings thereby driving the motor;
perform a rough adjustment of the rotor speed when a difference between a determined rotor speed ($T_{actual}$) and a specified target speed ($T_{target}$) exceeds a specified rotor speed threshold, the rough adjustment of the rotor speed performed during a complete revolution of the rotor by not supplying a current pulse to no more than half of the phase windings of the plurality of phase windings; and
perform a fine adjustment of the rotor speed after the rough adjustment when the determined rotor speed ($T_{actual}$) is larger than the specified target speed ($T_{target}$) and when the difference between the determined rotor speed ($T_{actual}$) and the specified target speed ($T_{target}$) is smaller than the specified threshold by switching on at least one switchable electrical resistor of the drive electronics for at least one subsequent commutation phase by at least one electronic switching element of the drive electronics.

10. A fan comprising the motor according to claim 9.

11. The system of claim 9, wherein:
the drive electronics circuit further includes a plurality of electrical resistors connected in series, which are individually switched on and short-circuited by at least one electronic switching element of the drive electronics circuit or a plurality of electronic switching elements as a function of the difference between the determined rotor speed ($T_{actual}$) and the specified target speed ($T_{target}$).

12. The system of claim 9, wherein the microprocessor is further operable to apply a maximum current of the current pulses to at least one of the phase windings during at least one commutation phase when the motor is started.

* * * * *